(12) United States Patent
Deiss

(10) Patent No.: US 9,879,907 B2
(45) Date of Patent: Jan. 30, 2018

(54) DEVICE FOR DRYING AND CRYSTALLIZING GRANULATE

(71) Applicant: AUTOMATIK PLASTICS MACHINERY GMBH, Grossostheim (DE)

(72) Inventor: Stefan Deiss, Harxheim (DE)

(73) Assignee: Automatik Plastics Machinery GmbH, Grossostheim (DE)

(*) Notice: Subject to any disclaimer, the term of this patent is extended or adjusted under 35 U.S.C. 154(b) by 547 days.

(21) Appl. No.: 14/568,060

(22) Filed: Dec. 11, 2014

(65) Prior Publication Data

US 2015/0096187 A1    Apr. 9, 2015

Related U.S. Application Data

(63) Continuation of application No. PCT/EP2013/001714, filed on Jun. 11, 2013.

(30) Foreign Application Priority Data

Jun. 12, 2012  (DE) .................. 10 2012 011 641
Jun. 11, 2013  (WO) ................ PCT/EP2013/001714

(51) Int. Cl.

| B29B 9/16 | (2006.01) |
| F26B 3/02 | (2006.01) |
| F26B 17/00 | (2006.01) |
| F26B 21/00 | (2006.01) |
| F26B 17/02 | (2006.01) |
| B29B 9/06 | (2006.01) |

(52) U.S. Cl.
CPC .................. *F26B 3/02* (2013.01); *B29B 9/16* (2013.01); *F26B 17/00* (2013.01); *F26B 17/02* (2013.01); *F26B 21/004* (2013.01); *B29B 9/065* (2013.01); *B29B 2009/165* (2013.01)

(58) Field of Classification Search
CPC .. F26B 3/02; F26B 17/00; F26B 17/02; F26B 21/004; B29B 9/16
USPC ........................................................ 23/295 R
See application file for complete search history.

(56) References Cited

U.S. PATENT DOCUMENTS

| 6,099,778 A | 8/2000 | Nelson et al. |
| 2009/0218052 A1 | 9/2009 | DeBruin et al. |

FOREIGN PATENT DOCUMENTS

| DE | 19902458 A1 | 7/2000 |
| EP | 0379684 A2 | 8/1990 |
| EP | 0451546 A2 | 10/1991 |

(Continued)

*Primary Examiner* — Edward Johnson
(74) *Attorney, Agent, or Firm* — Buskop Law Group, P.C.; Wendy Buskop

(57) ABSTRACT

A method and device for continuously drying and crystallizing water-flushed granulate. The method comprises the steps of: feeding water-flushed granulate into a pre-dryer, pre-drying granulate in the pre-dryer, conveying pre-dried granulate into a dryer/crystallizer, and discharging crystallized granulate from the dryer/crystallizer. An air conditioning means produces temperature-controlled and humidity-conditioned air that is delivered to the dryer/crystallizer, wherein the exhaust air of the dryer/crystallizer is delivered to the pre-dryer, and wherein the exhaust air of the pre-dryer is returned to the air conditioning means forming a closed air circuit is formed by the dryer/crystallizer, pre-dryer, and air conditioning means. The device comprises a pre-dryer, a dryer/crystallizer, an air conditioning means, and optionally a control unit.

6 Claims, 2 Drawing Sheets

(56) References Cited

FOREIGN PATENT DOCUMENTS

| EP | 2433771 A1 | 3/2012 |
|----|------------|--------|
| FR | 1352614 A  | 2/1964 |
| WO | 2009027064 A2 | 8/2008 |

DEVICE FOR DRYING AND CRYSTALLIZING GRANULATE

CROSS REFERENCE TO RELATED APPLICATIONS

The present patent application is a Continuation Application that claims priority to and the benefit of co-pending International Patent Application No. PCT/EP2013/001714, filed Jun. 11, 2013, entitled "METHOD AND DEVICE FOR DRYING AND CRYSTALLIZING GRANULATE", which claims priority to DE Application No. 102012011641.1 filed Jun. 12, 2012, entitled "METHOD AND DEVICE FOR DRYING AND CRYSTALLIZING GRANULATE". These references are incorporated in their entirety herein.

FIELD

The present embodiments generally relate to a method and a device for drying and crystallizing water-flushed granulate.

BACKGROUND

A method and a device for continuously crystallizing polyester granulate wherein granulate is passed through two fluidized beds connected in series is known in the art. The first fluidized bed is a bubbling bed and the second fluidized bed is a circulating fluidized bed.

An entering amorphous flow of granulate is heated and precrystallized in the bubbling bed with intensive movement and mixing with existing crystalline material. Heated air or an inert gas such as nitrogen is used for fluidization. The exhaust gas from the bubbling bed escapes upward and can be recirculated back to the bubbling bed. The flow of granulate emerging from the bubbling bed enters the circulating fluidized bed, which has a channel-like receptacle that is provided at the bottom with a perforated plate. The exhaust gas from the circulating fluidized bed can likewise be returned to the circulating fluidized bed in a circuit.

This method has the disadvantage that separate, individual circuits must be provided for the return and recovery of the process gas both for the fluidized bed and for the bubbling bed. This gives rise to increased installation effort, increased capital expenditures, and operating costs.

A method and an arrangement for producing low-hydrolysis polyester granulates in which a mixture of pellets and water produced by underwater granulation is fed into an agitating centrifuge as a pre-dryer as known in the art.

From the pre-dryer, pellets are conveyed via a classifying screen to a collecting vessel and then are subsequently conveyed to a delay silo. Air, which is delivered at approximately room temperature, flows through the delay silo. The exhaust air from the silo can be used to purge the collecting vessel and the pre-dryer. The air emerging from the delay silo is heated to a temperature of 140 degrees Celsius to 180 degrees Celsius using a heater. An injection condenser follows the pre-dryer in order to extract the water vapor from the exhaust air of the pre-dryer and to recover process water.

In this arrangement, the delay silo must of necessity be present and must be integrated into the arrangement in order to be able to use the exhaust air of the delay silo for purging the pre-dryer and collecting vessel. Consequently, the method is not suitable for applications in which no delay silo is used, or for applications in which a delay silo is operated at a different, distant location decoupled from the drying of the granulate. Moreover, the exhaust air of the pre-dryer, or of the injection condenser, is not used further and thus the heat energy contained therein remains unused and is wasted.

One object of the present invention is thus to overcome the abovementioned disadvantages and to specify a method and a device for drying and crystallizing water-flushed granulate that entail less installation effort and lower installation and operating costs.

Another object of the present invention is to specify a method and a device for drying and crystallizing water-flushed granulate that are versatile and more energy efficient in operation.

These and other objects of the present invention are attained by the present embodiments.

BRIEF DESCRIPTION OF THE DRAWINGS

The detailed description will be better understood in conjunction with the accompanying drawings as follows.

Figure 1:
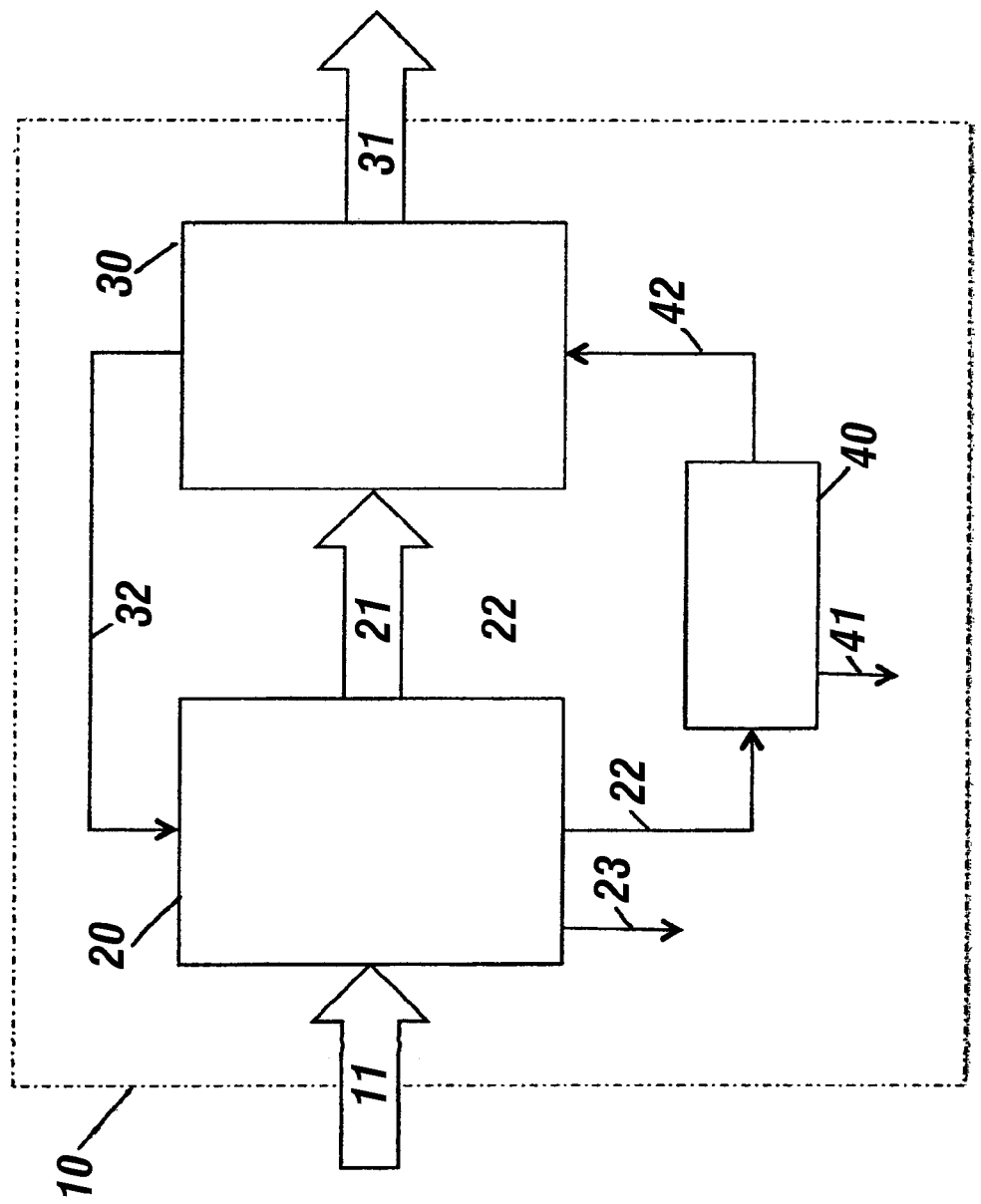
FIG. 1 shows a schematic representation of a device for drying and crystallizing granulate.

The present embodiments are detailed below with reference to the listed Figures.

DETAILED DESCRIPTION OF THE EMBODIMENTS

Before explaining the present method and apparatus in detail, it is to be understood that the method and apparatus are not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to a method for continuously drying and crystallizing water-flushed granulate. The method can have the following steps: feeding water-flushed granulate into a pre-dryer, pre-drying granulate in the pre-dryer, conveying pre-dried granulate into a dryer/crystallizer, and discharging crystallized granulate from the dryer/crystallizer.

An air conditioning means can produce temperature-controlled and humidity-conditioned air, such as air which is hot, dry, cooled, and/or slightly humidified for increased production of nucleation sites. This temperature-controlled and humidity-conditioned air is delivered to the dryer/crystallizer, the exhaust air of the dryer/crystallizer is delivered to the pre-dryer, and the exhaust air of the pre-dryer is returned to the air conditioning means, forming a closed air circuit.

In this way, the air is directed from the air conditioning means through the dryer/crystallizer, the pre-dryer, and back to the air conditioning means, where the air is reprocessed for reinjection into the dryer/crystallizer.

As a result, only one air conditioning means is necessary in order to produce the purge air for the pre-dryer and the dryer/crystallizer. Consequently, the method can be implemented requiring lower installation effort, equipment costs, and maintenance costs. The air circuit is not coupled to upstream or downstream processes, so the method can be integrated into a variety of larger overall processes in a simple manner.

The recirculation of the pre-dryer exhaust air offers the advantage that the heat energy contained in the exhaust air of the pre-dryer can be reused, thereby saving energy. As a result, regeneration and repeated production of temperature-controlled and humidity-conditioned air requires a commensurately smaller amount of energy expenditure. In this way, the costs for operation of the method can be reduced.

The pre-drying can take place in a centrifugal dryer as the pre-dryer. The air conditioning means can dehumidify and heat the returned exhaust air of the pre-dryer to produce dry, hot air for drying/crystallizing in the dryer/crystallizer.

Granulate to be crystallized can be transported in the dryer/crystallizer on a belt conveyor, by a chute, by a fluid bed, by a vibrating trough, by a vessel with an agitator, and the like.

Granulate can be screened in the dryer/crystallizer or downstream thereof, using a screen, such as a classifying screen.

The air delivered to the dryer/crystallizer can have a temperature in the range from 140 degrees Celsius to 200 degrees Celsius.

In the pre-dryer, granulate can be pre-dried to a temperature of 130 degrees Celsius or above.

In the dryer/crystallizer, granulate can be heated to a temperature in the range from 160 degrees Celsius to 180 degrees Celsius.

The air conditioning means can be controlled such that the air delivered to the pre-dryer is regulated to a predetermined dew point.

In a second aspect, the present invention relates to a device for continuously drying and crystallizing water-flushed granulate.

The device can have a pre-dryer that has an inlet for feeding water-flushed granulate and an outlet for discharging pre-dried granulate. The device can have a dryer/crystallizer that has an inlet for feeding the pre-dried granulate and an outlet for discharging dried and crystallized granulate. The device can have an air conditioning means for producing temperature-controlled (heated or cooled) and humidity-conditioned (dehumidified or humidified) air, such as dry, hot air that can be delivered to the dryer/crystallizer.

The device can be configured to deliver an exhaust air of the dryer/crystallizer to the pre-dryer, and additionally configured to return an exhaust air of the pre-dryer to the air conditioning means, in order to form a closed air circuit.

The pre-dryer can be a centrifugal dryer.

The air conditioning means can have a mist eliminator and/or a molecular sieve with zeolite material for dehumidifying the exhaust air returned from the pre-dryer, a heating means for heating the air, and a blower for producing an air flow. As a result it is possible for air with a low dew point such as −40 degrees Celsius to be produced, that can in turn absorb humidity from the process.

The dryer/crystallizer can have a belt conveyor, a chute, a fluid bed, a vibrating trough, a vessel with agitator, and the like for transporting granulate. A screen, such as a classifying screen, can be provided in the system (located in the dryer/crystallizer and/or subsequent thereto) in order to screen granulate.

The device can have a control unit for controlling the air conditioning means in order to control a temperature, a volume, a humidity of the air to be delivered to the dryer/crystallizer, and the like. For example, the control unit can be configured to control or regulate the air delivered to the pre-dryer to a predefinable dew point.

Turning now to the Figures, FIG. 1 shows a schematic representation of a device and method for drying and crystallizing granulate.

The device 10 for continuous drying and crystallization of water-flushed granulate can have a dryer 20, a dryer/crystallizer 30, and air conditioning means 40. The dryer 20 can be a centrifugal dryer.

Water-flushed granulate 11 is delivered to the dryer 20. In the dryer 20, water is separated out and can be discharged as waste water 23. Granulate can be subjected to preliminary drying in the dryer 20, and discharged from the dryer 20 as pre-dried granulate 21 in order to be delivered to a dryer/crystallizer 30.

In the dryer/crystallizer 30, granulate can be final dried and crystallized to the desired final semicrystalline value in order to be discharged from the dryer/crystallizer 30 as crystallized granulate 31.

The air conditioning means 40 can produce an air flow of temperature-controlled and humidity-conditioned air, such as hot, dry air 42, which is delivered to the dryer/crystallizer 30. The hot, dry air 42 can serve as purge air for the dryer/crystallizer 30 in order to dry and to crystallize the granulate.

The exhaust air 32 of the dryer/crystallizer 30 can be delivered to the dryer 20 in order to purge the dryer 20 for pre-drying the granulate.

Exhaust air 22 emitted by the centrifugal dryer can be returned to the air conditioning means 40. The air conditioning means 40 can reprocess the returned air 22 to once again produce the hot, dry air 42 for the dryer/crystallizer.

Thus, the air within the device 10 is directed in a closed circuit, proceeding from the air conditioning means 40, through the dryer/crystallizer 30, the dryer 20, and back to the air conditioning means 40, where the air is reprocessed for reinjection into the dryer/crystallizer 30.

Figure 2:
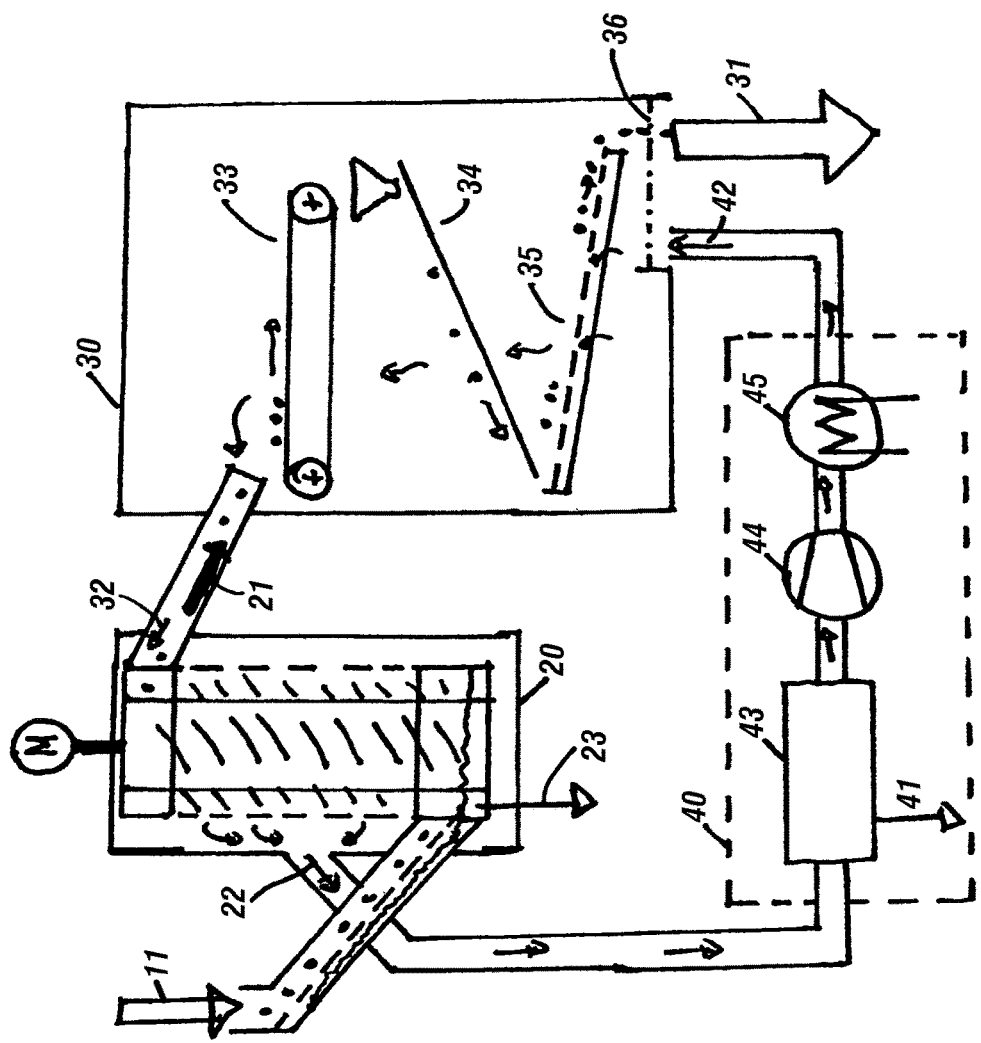
FIG. 2 shows a device for drying and crystallizing granulate.

FIG. 2 shows a device for drying and crystallizing granulate.

A granulate/water mixture 11, which can have a temperature in the range from 70 degrees Celsius to 95 degrees Celsius, for example, is delivered to the dryer 20 through a pipe. A screen can be implemented in the pipe in order to remove water from the granulate/water mixture 11. Water can likewise be removed in the lower region of the dryer 20. The water that is removed can be discharged as waste water 23 and reused to renew the process water in a granulate production process upstream of granulate drying process.

In the dryer 20, granulate is set in motion by the rotor of the dryer and travels upward through the dryer 20 in order to be discharged as pre-dried granulate 21 in an upper region of the dryer 20. The pre-dried granulate 21 can have a temperature of over 130 degrees Celsius. The dryer can be purged in the opposite direction with an air flow. The air flow 32 can enter the dryer 20 in the upper region thereof. The air flow can dry granulate and in so doing absorb water droplets and water vapor being formed. The air from the dryer exits as exhaust air 22 in counterflow to the direction of motion of the granules there.

Granulate 21 that has been pre-dried in this manner can be fed to the dryer/crystallizer 30. For example, the feed can be implemented as a down pipe, in which the pre-dried granulate is conveyed from the upper region of the dryer 20 to the dryer/crystallizer 30 using gravity.

Various devices can be arranged inside the dryer/crystallizer 30 in order to transport granulate. For example, the dryer/crystallizer 30 can have a belt conveyor 33. The pre-dried granulate 21 drops onto one end of the belt conveyor 33 and is transported thereon. The conveyor belt of the belt conveyor can be implemented in the form of a screen in this design, so that an air flow can pass through the conveyor belt and flush granulate being transported on the conveyor belt for the purpose of drying and crystallizing the granulate. Granulate can be transported on the belt conveyor 33 for a period from 60 seconds to 120 seconds. A hopper can be placed at the other end of the belt conveyor 33, through which hopper the granulate drops onto a chute 34 to then slide along the chute.

A fluid bed 35 can also be provided in the dryer/crystallizer 30. The fluid bed can be provided with a perforated plate through which an air flow is conducted in order to transport granulate with gentle motion. Granulate can be transported on the fluid bed for a period of approximately 60 seconds.

In addition, a screen can be provided for screening granulate. The screen 36 can be located in the vicinity of the outlet of the dryer/crystallizer 30 so that the granulate 31 that is already final dried and crystallized to the desired final value is screened before leaving the dryer/crystallizer 30. When exiting the dryer/crystallizer 30, the dried and crystallized granulate can have a temperature in the range from 160 degrees Celsius to 180 degrees Celsius.

Once granulate has been transported through the dryer/crystallizer 30 in this manner, the granulate 31 that is dried and crystallized to the desired final semicrystalline value is discharged from the dryer/crystallizer 30.

In order to aid the drying and crystallization in the dryer/crystallizer 30, the dryer/crystallizer 30 can be purged with hot, dry air 42 that is produced and made available by the air conditioning means 40. After the hot, dry air 42 has passed through the dryer/crystallizer 30, the exhaust air 32 of the dryer/crystallizer can be used for the purpose of purging the dryer 20.

The transfer of the exhaust air 32 of the dryer/crystallizer 30 to the dryer 20 can take place through separate ducts. In embodiments, the exhaust air 32 can flow through the down pipe in the opposite direction from the pre-dried granulate 21, eliminating the need for separate air ducts.

Air conditioning means 40 can include a mist eliminator 43 for dehumidifying the exhaust air 22 returned from the dryer 20, a blower 44 for producing an air flow, and heating means 45 for heating the air, in order to produce the hot, dry air 42 for injection into the dryer/crystallizer 30. The water removed in the mist eliminator 43 can be discharged as waste water 41, to then be reused, perhaps as process water in an upstream process.

The air conditioning means can be controlled by a control unit (not shown) in order to control a temperature, a humidity, a volume of the air 42, and the like. The control can take place such that the air 32 supplied to the dryer 20 is controlled or regulated to a dew point that can be predetermined by an operator of the device 10.

While these embodiments have been described with emphasis on the embodiments, it should be understood that within the scope of the appended claims, the embodiments might be practiced other than as specifically described herein.

What is claimed is:

1. A device for continuously drying and crystallizing water-flushed granulate, having:
   a. a pre-dryer having an inlet for feeding water-flushed granulate and an outlet for discharging pre-dried granulate;
   b. a dryer crystallizer having an inlet for feeding the pre-dried granulate and an outlet for discharging dried and crystallized granulate; and
   c. an air conditioning means for producing temperature-controlled and humidity-conditioned air for delivery to the dryer/crystallizer; and
   wherein the device is configured to deliver an exhaust air of the dryer/crystallizer to the pre-dryer, and is additionally configured to return an exhaust air of the pre-dryer to the air conditioning means, forming a closed air circuit.

2. The device of claim 1, wherein the pre-dryer is a centrifugal dryer.

3. The device of claim 1, wherein the air conditioning means comprises:
   a. a mist eliminator or a molecular sieve for dehumidifying the exhaust air returned from the pre-dryer;
   b. a heating means for heating the air; and
   c. a blower means for producing an air flow.

4. The device of claim 1, wherein the dryer/crystallizer comprises at least one of the following:
   a. a belt conveyor;
   b. a chute;
   c. a fluid bed;
   d. a screen;
   e. a vibrating trough; and
   f. a vessel with an agitator.

5. The device of claim 1, further comprising a control unit for controlling the air conditioning means, wherein the control unit is configured to control a temperature, a humidity, or a volume of the air to be delivered to the dryer/crystallizer.

6. The device of claim 1, wherein the control unit is configured to control the temperature, humidity, or volume of the air to be delivered to the dryer/crystallizer in such a manner that the air delivered to the pre-dryer is controlled or regulated to a predefinable dew point.

* * * * *